US012364633B2

(12) United States Patent
McGregor

(10) Patent No.: US 12,364,633 B2
(45) Date of Patent: Jul. 22, 2025

(54) COLLAPSIBLE, PORTABLE LITTER

(71) Applicant: Pocket Litter LLC, Monument, CO (US)

(72) Inventor: Otis McGregor, Monument, CO (US)

(*) Notice: Subject to any disclaimer, the term of this patent is extended or adjusted under 35 U.S.C. 154(b) by 142 days.

(21) Appl. No.: 18/346,567

(22) Filed: Jul. 3, 2023

(65) Prior Publication Data

US 2024/0024175 A1 Jan. 25, 2024

Related U.S. Application Data

(60) Provisional application No. 63/369,288, filed on Jul. 25, 2022.

(51) Int. Cl.
*A61G 1/013* (2006.01)
*A61G 1/00* (2006.01)

(52) U.S. Cl.
CPC ............... *A61G 1/013* (2013.01); *A61G 1/00* (2013.01)

(58) Field of Classification Search
CPC .................................. A61G 1/013; A61G 1/00
USPC ...................................................... 5/627, 625
See application file for complete search history.

(56) References Cited

U.S. PATENT DOCUMENTS 547,288 A * 10/1895 Remington .............. A61G 1/02 D12/132
2,546,604 A * 3/1951 Lafky ..................... B62B 1/208 280/78
3,336,060 A * 8/1967 Bradford ................ A61G 1/003 5/8
3,426,367 A * 2/1969 Bradford ................ A61G 1/013 5/628
6,142,491 A * 11/2000 Darling, III ......... B62K 27/003 280/30
6,164,671 A * 12/2000 Darling, III .......... B62B 5/0083 280/30
6,270,092 B2 * 8/2001 Darling, III .......... B62B 5/0023 280/30
6,561,529 B2 * 5/2003 Darling, III ......... A61G 1/0293 280/47.21
7,017,939 B2 * 3/2006 Darling, III ............ B62B 1/002 280/646
7,150,465 B2 * 12/2006 Darling, III ......... A61G 1/0212 280/640

(Continued)

FOREIGN PATENT DOCUMENTS

EP 1188637 A2 * 3/2002 ............. A61G 1/013
WO WO-0040447 A2 * 7/2000 ........... B62B 5/0023

*Primary Examiner* — Robert G Santos
(74) *Attorney, Agent, or Firm* — MP Patents, LLC

(57) ABSTRACT

A collapsible, portable litter includes a support sheet and an expandable hub assembly. The support sheet has front and rear surfaces and a plurality of handles around a perimeter. Provided to the rear surface, the expandable hub assembly includes a hub and a plurality of stiffeners originating from the hub. An associated method includes pivoting a first folding stiffener in a first direction about a first pivot axis from a folded position to an extended position, pivoting a second folding stiffener in a second direction about a second pivot axis from a folded position to an extended position, extending a first telescoping stiffener from a first stiffener base between a retracted position and an extended position and extending a second telescoping stiffener from a second stiffener base between a retracted position and an extended position.

19 Claims, 5 Drawing Sheets

(56) References Cited

U.S. PATENT DOCUMENTS

| | | | | | |
|---|---|---|---|---|---|
| 7,392,994 | B2 * | 7/2008 | Darling, III | B62B 1/002 | 280/47.26 |
| 7,407,177 | B2 * | 8/2008 | Darling, III | B62B 1/002 | 280/47.25 |
| 7,461,857 | B2 * | 12/2008 | Darling, III | A61G 1/0293 | 280/640 |
| 7,766,365 | B2 * | 8/2010 | Darling, III | A61G 1/013 | 280/640 |
| 7,775,530 | B2 * | 8/2010 | Darling, III | A61G 1/0287 | 280/652 |
| 7,789,352 | B2 * | 9/2010 | Darling, III | A61G 1/0225 | 24/514 |
| 7,823,906 | B2 * | 11/2010 | Darling, III | A61G 1/0225 | 280/651 |
| 8,348,301 | B2 * | 1/2013 | Darling, III | A61G 1/0212 | 280/651 |
| 8,505,959 | B2 * | 8/2013 | Darling, III | B62B 13/18 | 280/651 |
| 2002/0041084 | A1 * | 4/2002 | Darling, III | A61G 1/0212 | 280/47.24 |
| 2003/0209886 | A1 * | 11/2003 | Darling, III | A61G 1/0293 | 280/30 |
| 2004/0222617 | A1 * | 11/2004 | Darling, III | A61G 1/0212 | 280/651 |
| 2006/0170173 | A1 * | 8/2006 | Darling, III | B62B 1/002 | 280/79.2 |
| 2006/0186622 | A1 * | 8/2006 | Darling, III | B62B 13/18 | 280/35 |
| 2007/0029760 | A1 * | 2/2007 | Darling, III | A61G 1/0287 | 280/640 |
| 2007/0029761 | A1 * | 2/2007 | Darling, III | B62B 1/12 | 280/640 |
| 2008/0030003 | A1 * | 2/2008 | Darling, III | A61G 1/013 | 280/651 |
| 2009/0051143 | A1 * | 2/2009 | Darling, III | B62B 1/12 | 280/640 |
| 2009/0151137 | A1 * | 6/2009 | Darling, III | B62D 63/061 | 24/568 |
| 2009/0212535 | A1 * | 8/2009 | Darling, III | B62B 13/18 | 280/651 |
| 2011/0309601 | A1 * | 12/2011 | Darling, III | B62B 1/002 | 280/657 |
| 2024/0024175 | A1 * | 1/2024 | McGregor | A61G 1/013 | |

* cited by examiner

COLLAPSIBLE, PORTABLE LITTER

CROSS REFERENCE TO RELATED APPLICATIONS

This application claims the priority benefit of U.S. Provisional Application No. 63/369,288 filed Jul. 25, 2022, pending, which is incorporated herein by reference in its entirety.

BACKGROUND

Emergency services responding to an incident such as traffic accident or a trip and fall at a home bring a variety life-saving capabilities. Fundamental to their role is the ability to stabilize the patient and provide transport to a higher level of care such as an emergency room or trauma center. Injuries, however, sometimes occur in remote, treacherous environments. Often, search and rescue vehicles, ambulances, and even all-terrain vehicles are incapable of reaching the victim and aiding in the initial phase of transport. The victim must first be carried from the location of the injury to transport.

When time is not critical, a stretcher or rigid litter can be brought to the location and used by rescue personnel to evacuate the victim to a location for further transportation. However, there are many cases in which transportation of the victim is time critical; either the victim cannot be treated at their location or they are in danger of additional injury should they remain in their current situation.

These issues are accentuated in a combat environment. Wounded soldiers need immediate medical attention—often in a hostile environment. Soldiers routinely practice carrying fallen comrades to safety for further treatment using a classic "fireman's carry" which is not an ideal form of "stabilized" transport. Indeed, such a carry can induce additional injuries. While a soft litter can be fashioned out of available material such as blanket or a parachute, this offers little to no stabilization.

SUMMARY

The disclosure describes a litter. The litter includes a support sheet and an expandble hub assembly. The support sheet has front and rear surfaces and a plurality of handles around a perimeter. Provided to the rear surface, the expandable hub assembly includes a hub and a plurality of stiffeners originating from the hub.

The disclosure also describes an expandable hub assembly for a litter. The expandable hub includes a hub and a plurality of stiffeners extending from the hub.

BRIEF DESCRIPTION OF THE FIGURES

The summary above, as well as the following detailed description of illustrative embodiments, is better understood when read in conjunction with the appended drawings. For the purpose of illustrating the disclosure, example constructions of the disclosure are shown in the drawings. However, the disclosure is not limited to specific methods and instrumentalities disclosed herein. Moreover, those in the art will understand that the drawings are not to scale. Wherever possible, like elements have been indicated by identical numbers.

Embodiments of the disclosure will now be described, by way of example only, with reference to the following diagrams wherein.

DETAILED DESCRIPTION

The following detailed description illustrates embodiments of the disclosure and manners by which they can be implemented. Although the best mode of carrying out the disclosure has been disclosed, those skilled in the art would recognize that other embodiments for carrying out or practicing the disclosure are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Current transportable litters are large and bulky and are only carried when necessary or required. No suitable options exist for compact, portable and effective means for facilitating transport of a non-ambulatory patient or other injured individual from a hazardous, remote location.

Disclosed litters rapidly deploy for evacuation of non-ambulatory patients out of the immediate danger zone and package small enough to fit into a cargo pocket of military fatigues or on a pair of pants. Such a litter can be carried by each individual soldier or first responder.

Embodiments of the disclosure provide a portable, collapsible litter. Embodiments of the disclosure substantially eliminate, or at least partially address, problems in the prior art, enabling portability by a single individual and sufficient stabilization to prevent additional injuries during transportation.

Disclosed litters are light weight, have a carry or storage size sufficiently small to fit into a U.S. military uniform thigh cargo pocket. The litters may be rapidly and easily deployed by one person and may be used by a single bearer to rapidly evacuate a non-ambulatory patient out of the zone of immediate danger without the need to pick up and carry the non-ambulatory person, for example, over the shoulder.

In one embodiment, disclosed litters can be employed by one person to drag a patient out of an area of immediate harm or by multiple persons to carry the patient as with known litters. Stabilization stiffeners keep the patient stable during transport to minimize aggravating current injuries or causing additional harm. Disclosed litters may be made available in conjunction with AEDs in public spaces like office buildings, shopping malls, and airports.

Additional aspects, advantages, features and objects of the disclosure will be made apparent from the drawings and the detailed description of the illustrative embodiments construed in conjunction with the appended claims that follow. It will be appreciated that features of the disclosure are susceptible to being combined in various manners without departing from the scope of the disclosure as defined by the appended claims.

Figure 1:
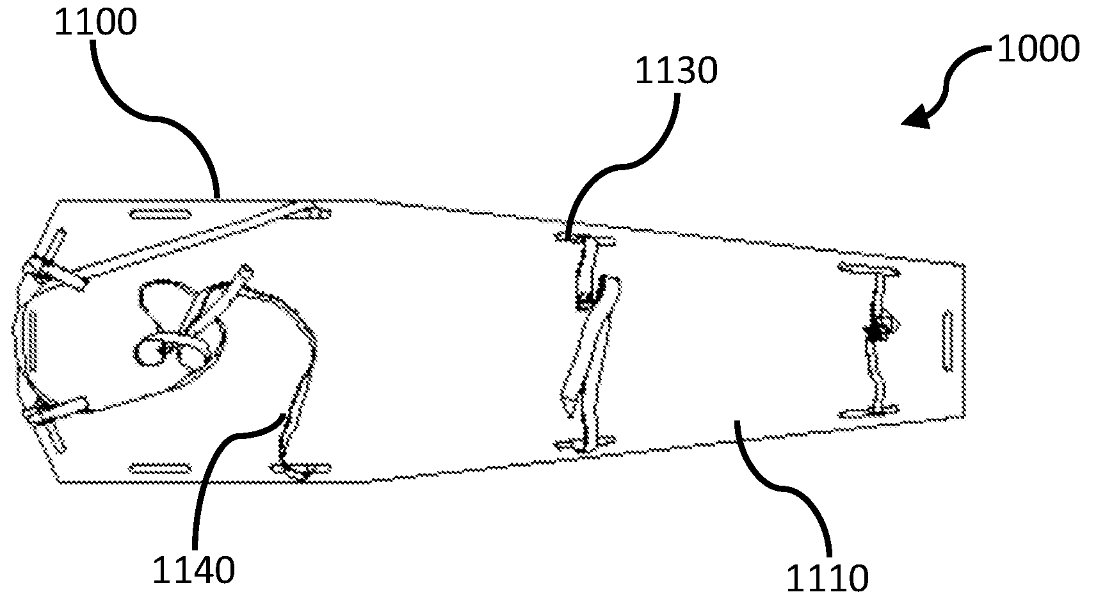
FIG. 1 illustrates a top view of an example collapsible, portable litter.
Figure 2:
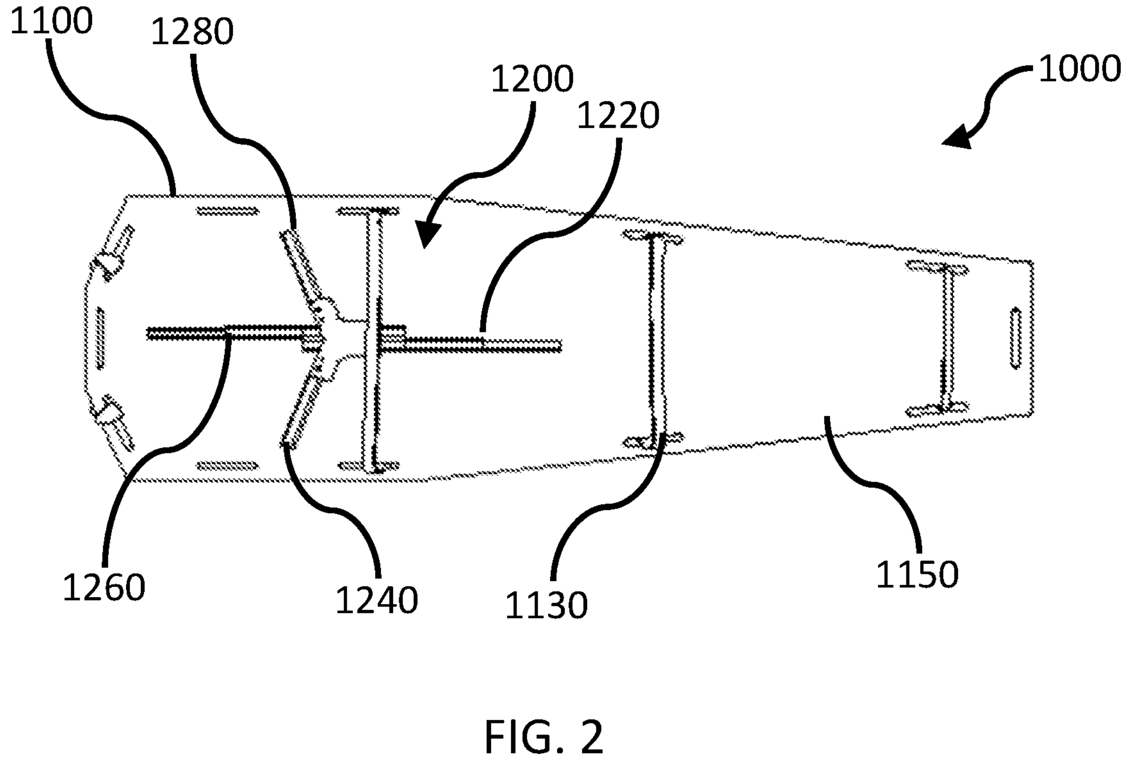
FIG. 2 illustrates a bottom view of the example litter of FIG. 1.

Referring now to the drawings, particularly by their reference numbers, FIGS. 1 & 2 illustrate an example collapsible, portable litter 1000. Litter 1000 includes a support sheet 1100 and an expandable hub assembly 1200.

Support sheet 1100 has a front surface 1110 and a rear surface 1150 and a plurality of handles 1130 around a perimeter of sheet 1100. Handles 1130 may be provided as elongated perforations or cut-outs through support sheet 1100 and enable dragging and/or lifting a non-ambulatory patient to safety. While support sheet 1100 has been depicted with eleven handles, it may be provided with any number of handles suitable for grasping and dragging or lifting litter 1000.

In an example, support sheet 1100 exhibits an octagonal shape. In a further example, support sheet 1100 exhibits an irregular octagonal shape. In another example, support sheet 1100 tapers from a first end towards a second end.

Support sheet 1100 may be folded and/or hemmed at its periphery so as to include a plurality of layers there. As a result, support sheet 1100 may have an example thickness of about 2.5-3.0 mm at its periphery while having an example thickness of about 0.5 mm internal to its periphery. Support sheet 1100 may be formed from any of a variety of lightweight, durable, flexible, wrap-able materials suitable for supporting and cradling a non-ambulatory person or other patient with tension applied from the edges. Such materials include but are not limited to fabrics such as Dyneema, nylon or Hypalon. Further, the selected material or materials may be highly resistant to punctures and tears as well as heat to prevent melting or igniting during use.

Figure 3:
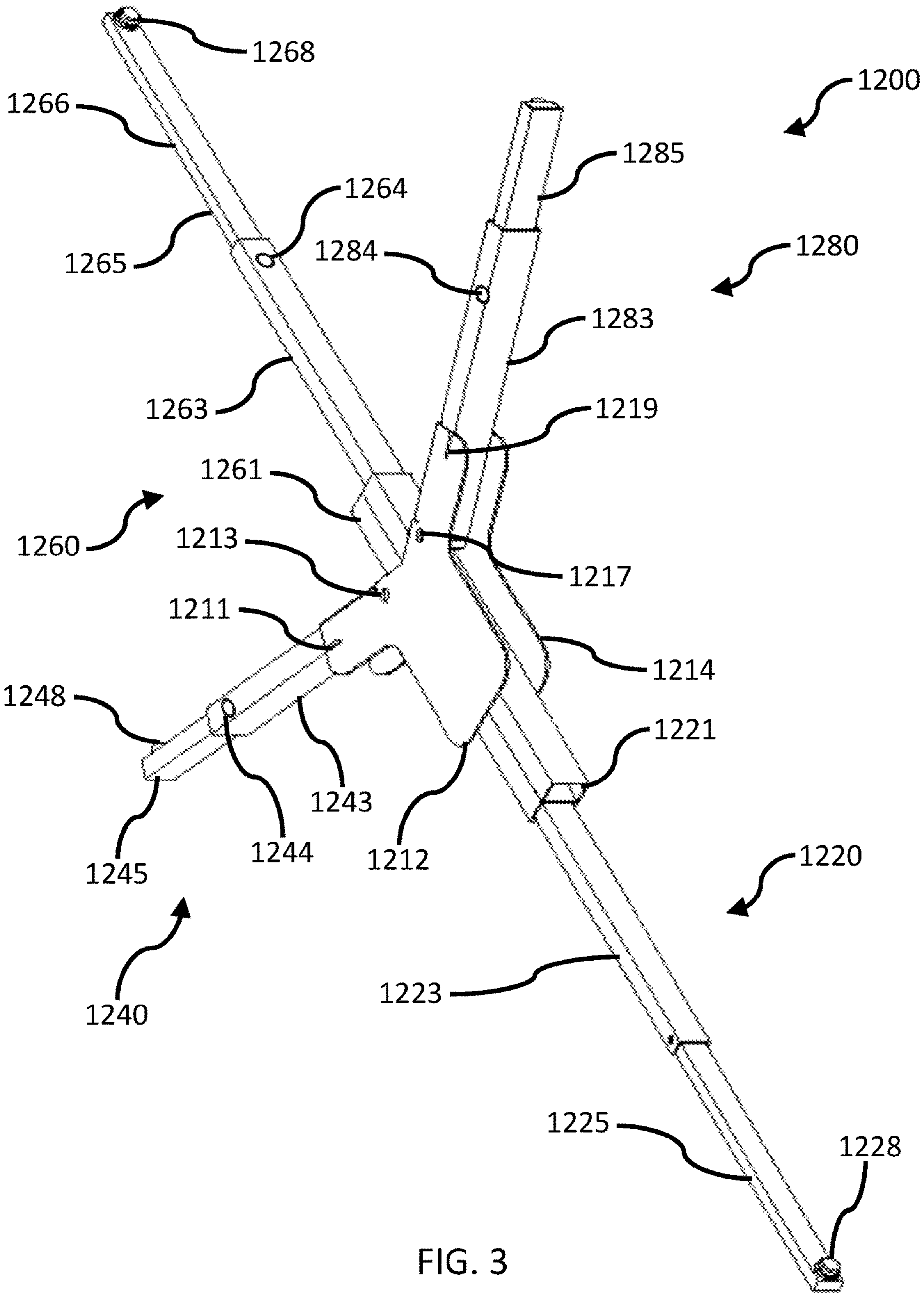
FIG. 3 illustrates a perspective view of an example hub assembly suitable for use in association with disclosed litters.
Figure 4:
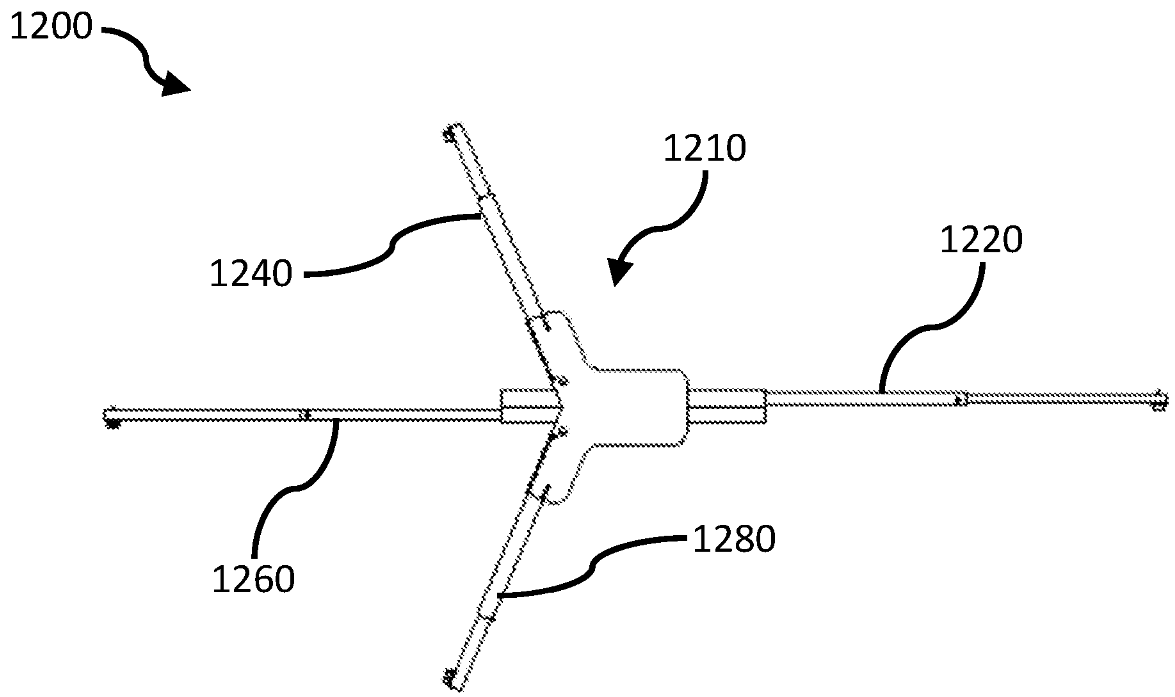
FIG. 4 illustrates a top view of the example hub assembly of FIG. 3 in an expanded configuration.
Figure 5:
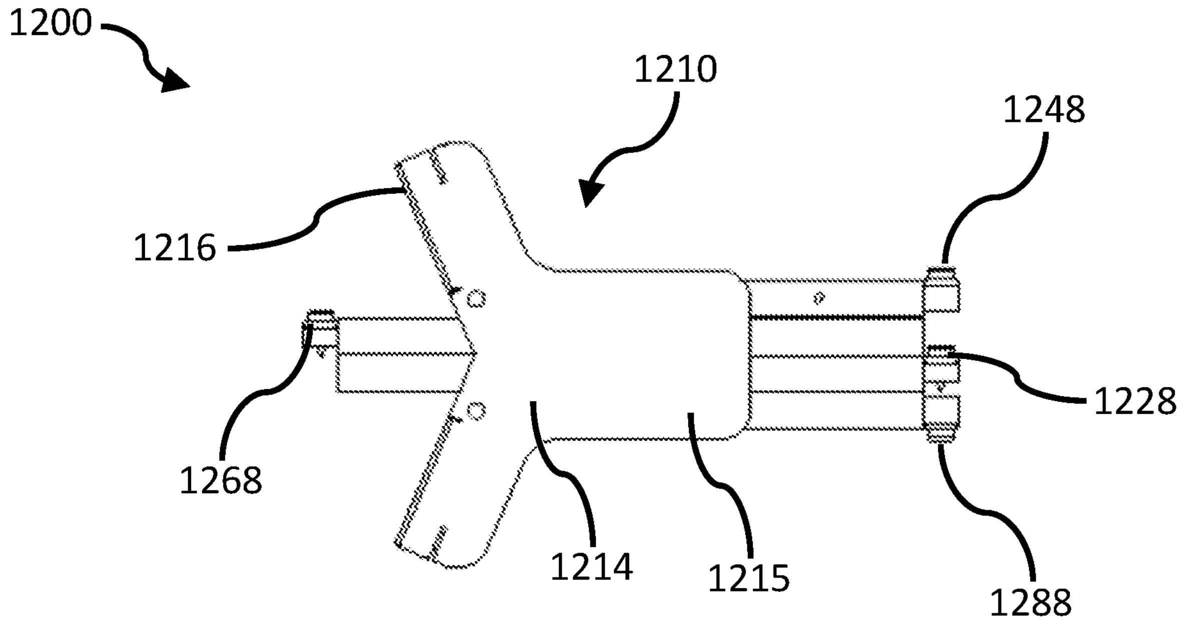
FIG. 5 illustrates a top view of the example hub assembly of FIG. 3 in a collapsed configuration.

FIGS. 3-5 illustrate an example hub assembly 1200 suitable for use in association with disclosed litters. Provided to rear surface 1150 of support sheet 1100, expandable hub assembly 1200 is configured for transitioning between collapsed and expanded states. Hub assembly 1200 includes a hub 1210 (FIGS. 4 & 5) and a number of support rods, stabilizers or stiffeners 1220, 1240, 1260 and 1280 originating from hub 1210.

Hub 1210 may further include a first 'Y'-shaped flange 1212 coupled with rear surface 1150 and a second 'Y'-shaped flange 1214 spaced from first 'Y'-shaped flange 1212 by a web 1216 having an opening therethrough. An oblique angle may be formed between the first arms and second arms of first and second 'Y'-shaped flanges 1212 and 1214 and a stem 1215 may extend from each pair of first and second arms at their intersection. Hub assembly 1200 may be coupled with rear surface 1150 at a central region of support sheet 1100 generally along its longitudinal axis.

First and second stiffener bases 1221 and 1261 may extend through the opening in web 1216 in alignment with stem 1215 of first and second 'Y-'shaped flanges 1212 and 1214 such that first 'Y'-shaped flange 1212 is spaced from second 'Y'-shaped flange 1214, in part, by stiffener bases 1221 and 1261. In an example, stiffener bases 1221 and 1261 are adjacent and parallel.

Alternatively, the hub may further include a first T'-shaped flange coupled with the rear surface and a second 'T'-shaped flange spaced from the first T'-shaped flange by first and second stiffener bases. The first and second stiffener bases may be aligned with a stem of the first and second T-'shaped flanges and the folding stiffeners may be aligned with the arms of the T'-shaped flanges in their folded open position.

The stiffeners may further include a first telescoping stiffener 1220 extending from hub 1210 in a first direction and a second telescoping stiffener 1260 extending from hub 1210 in a second direction opposite from the first direction. For example, first and second telescoping stiffeners 1220 and 1260 may extend from first and second stiffener bases 1221 and 1261, respectively. First and second telescoping stiffeners 1220 and 1260 extend in directions generally parallel with the longitudinal axis of support sheet 1100. As such, first and second telescoping stiffeners 1220 and 1260 may be suitable for stabilizing a patient's spine against bending.

First and second telescoping stiffeners 1220 and 1260 are configured for transitioning between an extended state (FIGS. 3 & 4) having a first length and a retracted state (FIG. 5) having a second length less than the first length.

In an example, the second length is approximately one-third the first length. In the extended and open state, first and second telescoping stiffeners 1220 and 1260 may exhibit any of a variety of lengths suitable for extending generally along the length of a patient's spine. Stiffeners may vary in length in accordance with the length of the litter and a patient's spine from C1 to L5. In an example, the length measured between the distal ends of first and second stiffeners 1220 and 1260 in the extended and open state may be approximately 919.2 mm (36").

Stiffeners 1220 and 1260 may each include one or more lock buttons 1264 enabling motion of segments 1225 and 1265 relative to segments 1223 and 1263, respectively, in a depressed state while preventing motion in an elevated state protruding through a hole in segments 1223 and 1263.

The stiffeners may further include first and second folding stiffeners 1240 and 1280 pivotably coupled with hub 1210. For example, the stiffeners may include a first folding stiffener 1240 pivotably coupled between first arms of 'Y'-shaped flanges 1212 and 1214 at a pivot point 1213 and a second folding stiffener 1280 pivotably coupled between second arms of 'Y'-shaped flanges 1212 and 1214 at a pivot point 1217. First and second folding stiffeners 1240 and 1280 may be configured for independent pivoting between a first position parallel with one another (FIG. 5) to a second position exhibiting an oblique angle therebetween (FIGS. 3 & 4).

In the second position, each folding stiffener 1240 and 1280 may form an obtuse angle with first and/or second stiffener bases 1221 and 1261 and stem 1215 of 'Y'-shaped flanges 1212 and 1214. In the second position, first folding stiffener 1240 is parallel with the first arms of 'Y'-shaped flanges 1212 and 1214 and second folding stiffener 1280 is parallel with the second arms of 'Y'-shaped flanges (FIGS. 3 & 4) which may also mean parallel with web 1216. In a further example, folding stiffeners 1240 and 1280 pivot to a second position contacting web 1216 such that the second position is limited by web 1216.

In an example, each folding stiffener 1240 and 1280 pivots through an angle of between around 100 degrees and around 120 degrees between folded and unfolded positions. In the second position, folding stiffeners 1240 and 1280 extend in directions generally transverse relative to support sheet 1100 longitudinal axis and/or generally across a width of support sheet 1100. In an example, in the second position, folding stiffeners 1240 and 1280 extend across support sheet 1100 at a point of support sheet 1100 greatest width. As such, folding stiffeners 1240 and 1280 may be suitable to stabilize support sheet 1100 against wrapping the patient up and/or for stabilizing a patient's shoulders against rounding. In the extended and open state, first and second folding stiffeners 1240 and 1280 may exhibit any of a variety of lengths suitable for generally spanning the width of the patient's shoulders. In an example, the length measured between the distal ends of first and second folding stiffeners 2240 and 2280 is approximately 740.5 mm (30").

Folding stiffeners 1240 and 1280 may further include features such as resilient tongues 1211 and 1219 which engage a groove in hub 1210 in the folded open state to prevent undesired pivoting of stiffeners 1240 and 1280 into the closed state during transport of a patient. Lock button 1244 enables motion of segment 1245 relative to segment 1243 in a depressed state while preventing motion in an elevated state protruding through a hole in segment 1243 and lock button 284 enables motion of segment 1285 relative to segment 1283 in a depressed state while preventing motion in an elevate state protruding through a hole in segment 1283.

Hub assembly 1200 including hub 1210 and stiffeners 1220, 1240, 1260 and 1280 may be formed from any of a variety of sturdy, durable lightweight materials. Hub 1210 joins the stiffeners to a central location from which the stiffeners extend and create a stable structure. In an example, hub assembly 1200 is formed from e-glass. In an example, hub 1210 is formed from 3D printed plastic, injection molded plastic, milled stainless steel or combinations of these.

Stiffeners 1220, 1240, 1260 and 1280 may be formed from carbon fiber or other rigid material having a high strength-to-weight ratio. For example, stiffeners 1220, 1240, 1260 and 1280 may be formed from aluminum, steel or combinations thereof.

Hub assembly 1200 has the approximate measurements of 152 mm (6") wide×227 mm (9") long×25.4 mm (1") thick in the collapsed state.

Resilient snap male components 1228 and 1268 provided to ends of telescoping stiffeners 1220 and 1260 are configured to be pressed into matching resilient snap female components provided to a support sheet 1100 of litter 1000. Similarly, resilient snap male components 1248 provided to ends of folding stiffeners 1240, 1280 are configured to be pressed into matching resilient snap female components provided to support sheet 1100.

Litter 1000 may further include one or more securing straps 1140 configured to maintain a patient or other non-ambulatory person on litter 1000. In an example, securing straps 1140 are threaded through handles 1130. Securing straps 1140 may further include buckles for maintaining the securing straps at preferred lengths and/or circumferences for sufficient tightness around the litter payload.

Litter 1000 is configured for transitioning between collapsed and expanded states. In an example, litter 1000 is configured to be deployed from the collapsed state in under 10 seconds. Litter 1000 has the approximate measurements of 152 mm (6") wide×227 mm (9") long×25.4 mm (1") thick in the collapsed state and a length of 90" in the expanded state. The width of litter 1000 in the expanded state tapers from approximately 914 mm to 609 mm (36" to 24"). Handles 1130 have the approximate dimensions of 38-63 mm (1.5-2.5") wide×127-178 mm (5-7") long. In a fully deployed state, disclosed litters form a carrying surface substantially 914 mm (36") wide and 2286 mm (90") long.

In one embodiment, the hub assembly is configured to automatically extend the stiffeners, for example, using springs or similar mechanism.

FIGS. 1-5 are merely examples, which should not unduly limit the scope of the claims herein. It is to be understood that the specific designation for litter 1000 is provided as an example and is not to be construed as limiting litter 1000 to specific numbers, types, or arrangements of components. A person skilled in the art will recognize many variations, alternatives, and modifications of embodiments of the disclosure.

Figure 6:
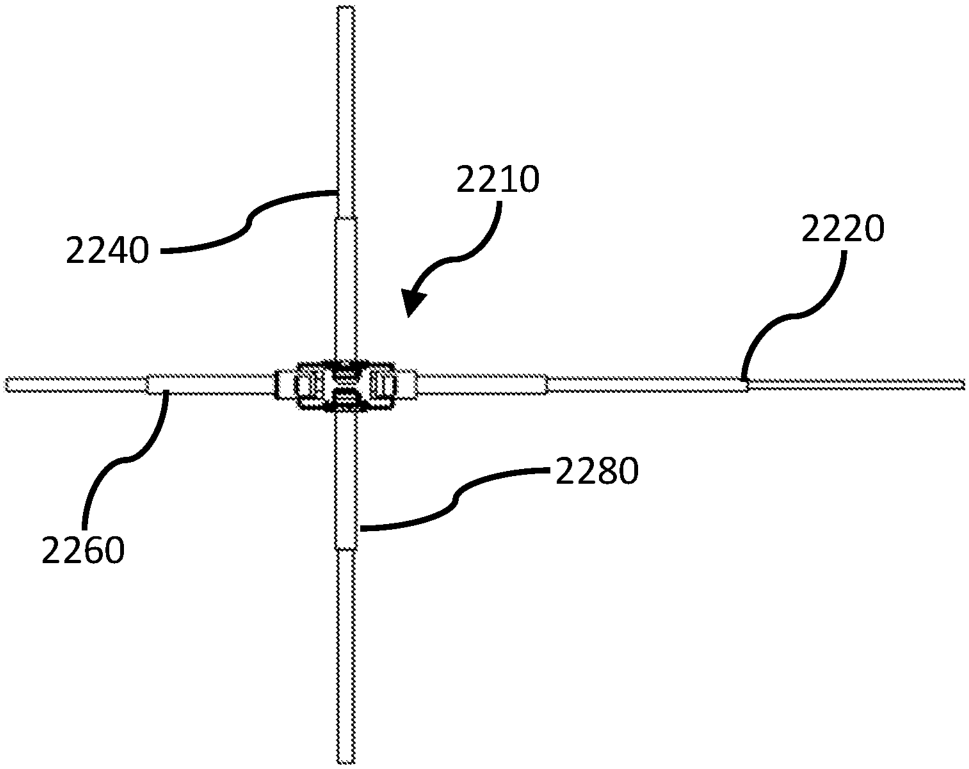
FIG. 6 illustrates a bottom view of another example hub assembly suitable for use in association with disclosed litters with the example hub assembly in an expanded configuration.
Figure 7:
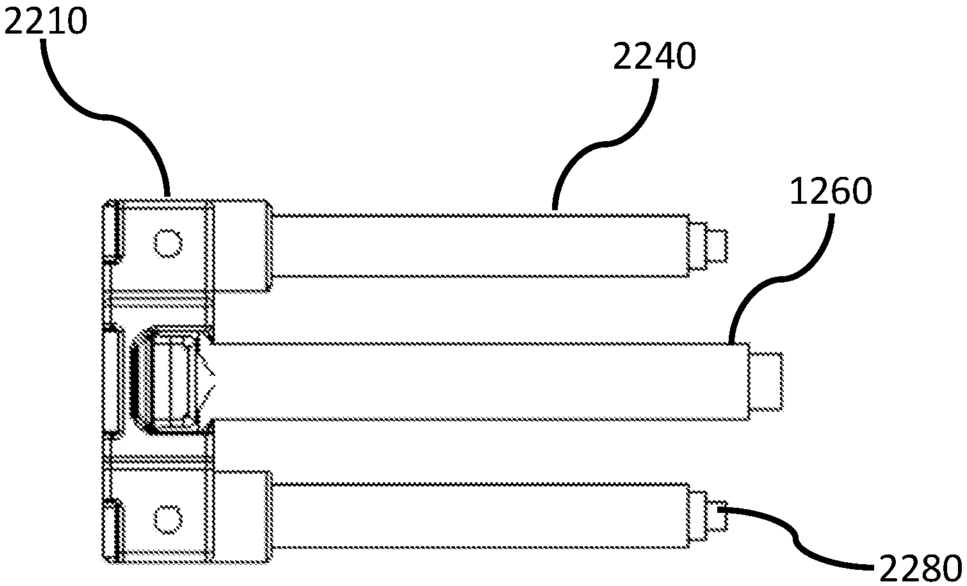
FIG. 7 illustrates a side view of the example hub assembly of FIG. 6 in a collapsed configuration.

FIGS. 6 & 7 illustrate another example hub assembly 2200 suitable for use in association with disclosed support sheets and/or litters. Hub assembly 2200 includes several stiffeners 2220, 2240, 2260 and 2280 and a hub 2210.

The stiffeners include first and second telescoping stiffeners 2220 and 2260 aligned along a first longitudinal axis as well as third and fourth telescoping stiffeners 2240 and 2280 aligned along a second longitudinal axis substantially perpendicular to the first longitudinal axis. Stiffeners 2240 and 2280 may be considered transverse, are perpendicular to longitudinal stiffeners 2220 and 2260 and are configured to secure the patient against lateral and/or torsional movement. First and second telescoping stiffeners 2220 and 2260 may be configured for transitioning between an extended state (FIG. 6) and a retracted state (FIG. 7). In the extended state, each stiffener may be between about twice and thrice its length in the retracted state.

First and second telescoping stiffeners 2220 and 2260 may be pivotable about first and second pivot axes, respectively, between open and closed positions and third and fourth telescoping stiffeners 2240 and 2280 may be pivotable about third and fourth pivot axes between open and closed positions. The first and second pivot axes may be parallel with the second longitudinal axis and the third and fourth pivot axes may be parallel with the first longitudinal axis.

In the extended and open state stiffeners 2220, 2240, 2260 and 2280 may exhibit any of a variety of lengths suitable for extending generally along the length of a patient's spine and generally spanning the width of the patient's shoulders. In an example, the length measured between the distal ends of first and second stiffeners 2220 and 2260 may be approximately 919.2 mm(36") while the length measured between the distal ends of third and fourth stiffeners 2240 and 2280 is approximately 740.5 mm (30").

Hub 2210 may take the general form of a rectangular prism and include first and second parallel walls intersecting third and fourth parallel walls. Each stiffener 2220, 2240, 2260 and 2280 may be pivotably anchored between the first and second walls or the third and fourth walls, for example, by an axle or pin. The axles or pins may, for example, be mounted in the walls at hinge barrels.

Hub assembly 2200 may further include several means biasing stiffeners 2220, 2240, 2260 and 2280 in open and extended positions or states. For example, a number of springs may push stiffeners 2220, 2240, 2260 and 2280 towards the state in which they are folded open and a number of springs may be provided within stiffeners 2220, 2240, 2260 and 2280 to push one segment away from another towards the state in which they are extended.

Figure 8:
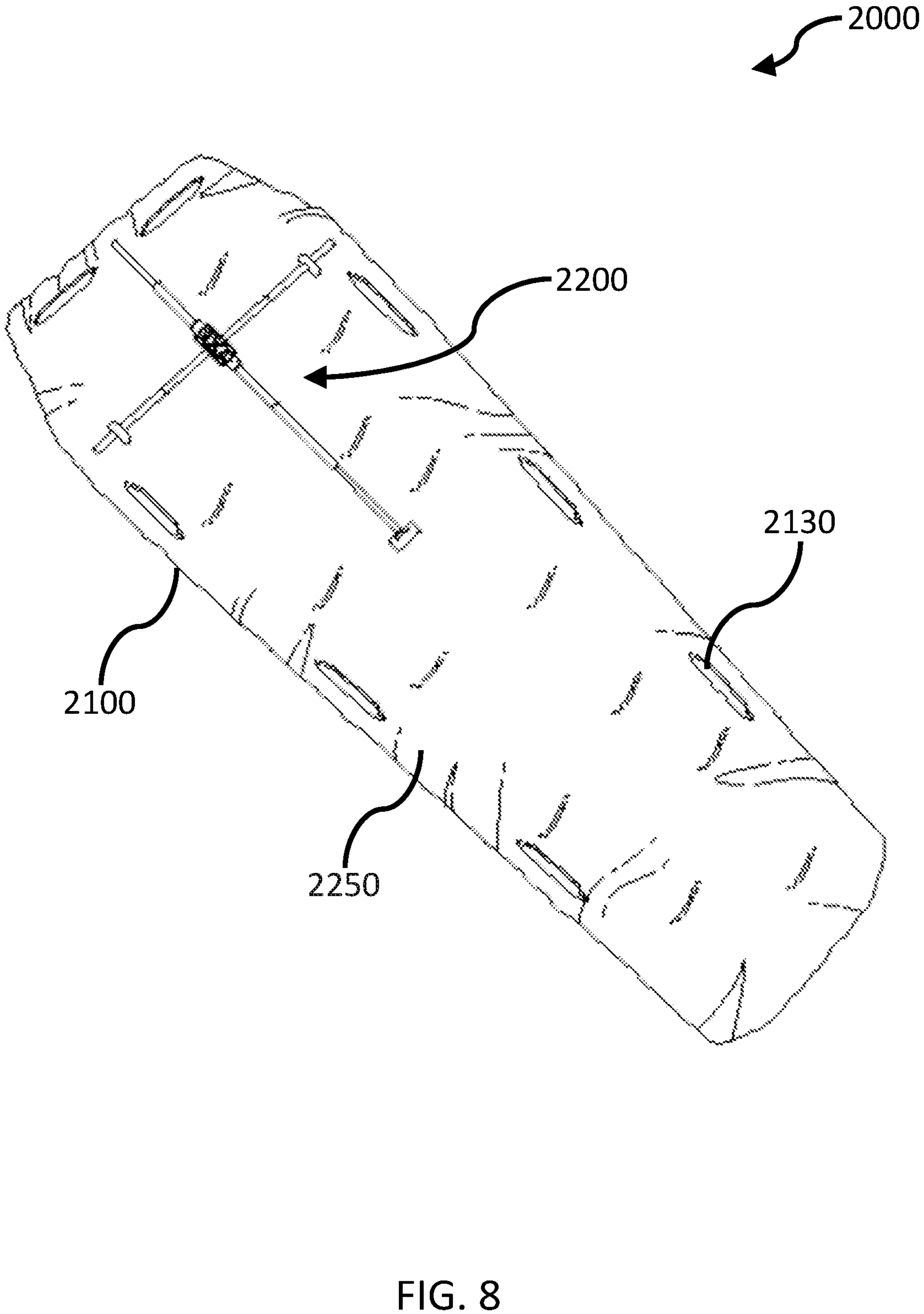
FIG. 8 illustrates a bottom perspective view of an example litter employing the example hub assembly of FIGS. 6 & 7.

FIG. 8 illustrates a bottom perspective view of an example litter 2000 employing example hub assembly 2200 of FIGS. 6 & 7 provided to rear surface 2150 of support sheet 2100. A number of stiffener anchors may be bonded with support sheet 2100 to receive and grip distal ends of stiffeners 2220, 2240, 2260 and 2280. Three of the stiffener anchors may be bonded to a periphery of support sheet 2100 while a fourth is bonded to a central portion of support sheet 2100 along a longitudinal axis. The stiffener anchors may comprise polyvinyl chloride and/or polytetrafluoroethylene.

Additionally or alternatively, resilient snap male components may be provided to ends of telescoping stiffeners 2220, 2240, 2260 and 2280 and configured to be pressed into matching resilient snap female components provided to a support sheet 2100.

Litter 2000 includes handles 2130 and may have the approximate measurements of 4" wide×9" long×4" thick in the collapsed state and a length of 90" in the expanded state.

In the folded state, stiffeners 2220, 2240, 2260 and 2280 are nested and aligned in a parallel position. The central hub releases stiffeners 2220, 2240, 2260 and 2280 to a form a cross frame that locks each stiffener, now with a perpendicular structure. Stiffeners 2220, 2240, 2260 and 2280 then extend to unfold support sheet 2100 and form the litter.

FIGS. 6-8 are merely examples, which should not unduly limit the scope of the claims herein. It is to be understood that the specific designation for litter 2000 is provided as an example and is not to be construed as limiting litter 2000 to specific numbers, types, or arrangements of components. A person of skill in the art will recognize many variations, alternatives, and modifications of embodiments of the disclosure.

Disclosed litters may be used in any of a variety of methods for evacuating a non-ambulatory person or other patient to a casualty collection point.

An example method includes pivoting a first folding stiffener approximately 100 degrees in a first direction about a first pivot axis from a folded position to an extended position, pivoting a second folding stiffener approximately 100 degrees in a second direction about a second pivot axis from a folded position to an extended position, extending a first telescoping stiffener from a first stiffener base between a retracted position and an extended position and extending a second telescoping stiffener from a second stiffener base between a retracted position and an extended position.

Pivoting of the second folding stiffener about the second pivot axis may be about an axis parallel with the first folding stiffener.

The first folding stiffener may be pivoted to the extended position so that a first tongue of a hub flange protrudes into a groove in the first folding stiffener while the second folding stiffener may be pivoted to the extended position so that a second tongue of a hub flange protrudes into a groove in the second folding stiffener.

The first telescoping stiffener may be extended so that a first lock button protrudes through a first hole in a first length of the first telescoping stiffener and a second lock button protrudes through a second hole in a second length of the first telescoping stiffener. The second telescoping stiffener may be extended so that a third lock button protrudes through a third hole in a first length of the second telescoping stiffener and a fourth lock button protrudes through a fourth hole in a second length of the second telescoping stiffener.

Resilient snap male components provided to ends of the telescoping stiffeners and may be pressed into matching resilient snap female components provided to a support sheet of the litter. Similarly, resilient snap male components provided to ends of the folding stiffeners may be pressed into matching resilient snap female components provided to the support sheet.

According to another method for using disclosed litters, a first folding stiffener is pivoted approximately 90 degrees in a first direction about a first pivot axis from a folded and closed position/state to an open and extended position/state, a second folding stiffener is pivoted approximately 90 degrees in a second direction about a second pivot axis from a folded and closed position/state to an open and extended position/state, a third folding stiffener is pivoted approximately 90 degrees in a third direction about a first pivot axis from a folded and closed position/state to an open and extended position/state and a fourth folding stiffener is pivoted approximately 90 degrees in a fourth direction about a second pivot axis from a folded and closed position/state to an open and extended position/state.

Extending the first folding stiffener lengthens the same approximately 100% from the retracted position/state, extending the second folding stiffener lengthens the same approximately 200% from the retracted position/state, extending the third folding stiffener lengthens the same approximately 100% from the retracted position/state and extending the fourth folding stiffener lengthens the same approximately 100% from the retracted position/configuration. The first, second, third and fourth folding stiffeners may be locked in the extended position with lock buttons.

The actions described above with respect to methods for using disclosed litters are only illustrative and other alternatives can also be provided where one or more actions are added, one or more actions are removed, or one or more actions are provided in a different sequence without departing from the scope of the claims herein.

Disclosed litters may be used one time or many.

Embodiments of the disclosure are susceptible to being used for various purposes, including, though not limited to, enabling portability by a single user and sufficient stabilization to prevent additional injuries during transportation of a non-ambulatory person.

Modifications to embodiments of the disclosure described in the foregoing are possible without departing from the scope of the disclosure as defined by the accompanying claims. Expressions such as “including”, “comprising”, “incorporating”, “consisting of”, “have”, “is” used to describe and claim the disclosure are intended to be construed in a non-exclusive manner, namely allowing for items, components or elements not explicitly described also to be present. Reference to the singular is also to be construed to relate to the plural.

What is claimed is:

1. A litter, comprising:

a support sheet having front and rear surfaces and a plurality of handles around a perimeter; and provided to the rear surface, an expandable hub assembly including:

a hub including a first ‘Y’-shaped flange and a second ‘Y’-shaped flange spaced from the first ‘Y’-shaped flange by a web; and a plurality of stiffeners originating from the hub.

2. The litter as set forth in claim 1, wherein the stiffeners further comprise a first telescoping stiffener extending from the hub in a first direction and a second telescoping stiffener extending from the hub in a second direction opposite from the first direction.

3. The litter as set forth in claim 2, wherein the stiffeners further comprise first and second folding stiffeners pivotably coupled with the hub.

4. The litter as set forth in claim 3, wherein the folding stiffeners pivot between a first position parallel with one another to a second position exhibiting an oblique angle therebetween.

5. The litter as set forth in claim 2, wherein the first and second telescoping stiffeners are configured for transitioning between a retracted state having a first length and an extended state having a second length approximately three times the first length.

6. The litter as set forth in claim 1, wherein the hub assembly is configured for transitioning between collapsed and expanded states.

7. The litter as set forth in claim 1, wherein the handles include elongated perforations through the support sheet.

8. The litter as set forth in claim 1, further comprising dot snaps configured to couple distal ends of the stiffeners with the support sheet.

9. The litter as set forth in claim 1, wherein the support sheet exhibits an irregular octagonal shape.

10. The litter as set forth in claim 1, further comprising one or more securing straps configured to maintain a patient on the litter.

11. The litter as set forth in claim 1, wherein the hub assembly is provided to a central portion of the support sheet.

12. The litter as set forth in claim 1, wherein the support sheet comprises a plurality of layers at its periphery.

13. The litter as set forth in claim 1, wherein the support sheet exhibits a thickness of about 0.5 mm internal to its periphery.

14. An expandable hub assembly for a litter, comprising:
a hub including a first 'Y'-shaped flange and a second 'Y'-shaped flange spaced from the first 'Y'-shaped flange by a web having an opening therethrough; and
a plurality of stiffeners originating at the hub.

15. The hub assembly as set forth in claim 14, further comprising first and second stiffener bases extending through the web opening.

16. The hub assembly as set forth in claim 15, wherein the stiffeners further comprise a first telescoping stiffener extending from the first stiffener base in a first direction and a second telescoping stiffener extending from the second stiffener base in a second direction opposite from the first direction.

17. The hub assembly as set forth in claim 14, wherein the stiffeners further comprise a first folding stiffener pivotably coupled between first arms of the 'Y'-shaped flanges and a second folding stiffener pivotably coupled between second arms of the 'Y'-shaped flanges.

18. The hub assembly as set forth in claim 17, wherein the folding stiffeners pivot between a first position parallel with one another to a second position contacting the web.

19. The hub assembly as set forth in claim 16, wherein the first and second telescoping stiffeners are configured for transitioning between a retracted state having a first length and an extended state having a second length approximately three times the first length.

* * * * *